United States Patent
Anantharam et al.

(10) Patent No.: US 9,088,477 B2
(45) Date of Patent: *Jul. 21, 2015

(54) DISTRIBUTED FABRIC MANAGEMENT PROTOCOL

(75) Inventors: Sushma Anantharam, Cupertino, CA (US); Nirapada Ghosh, Sunnyvale, CA (US); Keshav Govind Kamble, Fremont, CA (US); Dar-Ren Leu, San Jose, CA (US); Chandarani J. Mendon, San Jose, CA (US); Vijoy A. Pandey, San Jose, CA (US); Nandakumar Peethambaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,896

(22) Filed: Feb. 2, 2012

(65) Prior Publication Data
US 2013/0201873 A1 Aug. 8, 2013

(51) Int. Cl.
*H04L 12/28* (2006.01)
*H04L 12/24* (2006.01)

(52) U.S. Cl.
CPC .......... *H04L 41/0246* (2013.01); *H04L 41/044* (2013.01)

(58) Field of Classification Search
CPC ....................................................... H04L 45/02
USPC ......... 370/219, 254, 255, 396, 469, 216, 316, 370/350, 390, 401; 709/208, 253, 206, 223
See application file for complete search history.

(56) References Cited

U.S. PATENT DOCUMENTS

| 5,226,120 A | 7/1993 | Brown et al. |
|---|---|---|
| 5,522,042 A | 5/1996 | Fee et al. |

(Continued)

FOREIGN PATENT DOCUMENTS

| CN | 101098260 A | 1/2008 |
|---|---|---|
| CN | 102082690 A | 6/2011 |

(Continued)

OTHER PUBLICATIONS

IBM, "A Non-invasive Computation-assist Device for Switching Fabrics in a High-Performance Computing System", IP.com, Aug. 30, 2007, 5 pages.

(Continued)

*Primary Examiner* — Gregory Sefcheck
*Assistant Examiner* — Jael Ulysse
(74) *Attorney, Agent, or Firm* — Schmeiser, Olsen & Watts LLP; Michael A. Rodriguez

(57) ABSTRACT

A distributed fabric system comprises a plurality of independent network elements interconnected by inter-switch links and assigned to a same group. Each network element includes a switching chip, a processor, and memory storing program code that is executed by the processor. The program code of each network element includes a device configuration (DC) stacking module and a switch discovery protocol (SDP) module. The SDP module of each network element, when executed, discovers each other network element in the group and elects one of the network elements as a master network element. The SDP module of the master network element, when executed, sends messages to the DC-stacking module of the master network element. Each sent message identifies one of the network elements in the group. The DC stacking module of the master network element, when executed, maintains a record of all network elements that are currently members in the group.

23 Claims, 9 Drawing Sheets

(56) References Cited

U.S. PATENT DOCUMENTS

| | | | |
|---|---|---|---|
| 5,751,967 A | 5/1998 | Raab et al. | |
| 6,205,122 B1 | 3/2001 | Sharon et al. | |
| 6,597,689 B1 | 7/2003 | Chiu et al. | |
| 6,856,591 B1* | 2/2005 | Ma et al. | 370/216 |
| 6,880,086 B2 | 4/2005 | Kidder et al. | |
| 6,917,626 B1 | 7/2005 | Duvvury | |
| 6,934,749 B1 | 8/2005 | Black et al. | |
| 7,020,696 B1 | 3/2006 | Perry et al. | |
| 7,095,744 B2 | 8/2006 | Iny | |
| 7,133,403 B1* | 11/2006 | Mo et al. | 370/390 |
| 7,143,153 B1 | 11/2006 | Black et al. | |
| 7,225,244 B2 | 5/2007 | Reynolds et al. | |
| 7,230,917 B1 | 6/2007 | Fedorkow et al. | |
| 7,240,364 B1 | 7/2007 | Branscomb et al. | |
| 7,263,597 B2 | 8/2007 | Everdell et al. | |
| 7,266,595 B1 | 9/2007 | Black et al. | |
| 7,295,566 B1 | 11/2007 | Chiu et al. | |
| 7,299,290 B2 | 11/2007 | Karpoff | |
| 7,305,492 B2 | 12/2007 | Bryers et al. | |
| 7,349,960 B1 | 3/2008 | Pothier et al. | |
| 7,369,540 B1 | 5/2008 | Giroti | |
| 7,406,038 B1 | 7/2008 | Oelke et al. | |
| 7,441,154 B2 | 10/2008 | Klotz et al. | |
| 7,492,779 B2 | 2/2009 | Schzukin et al. | |
| 7,693,976 B2 | 4/2010 | Perry et al. | |
| 7,765,328 B2 | 7/2010 | Bryers et al. | |
| 7,818,387 B1* | 10/2010 | King et al. | 709/208 |
| 7,827,248 B2 | 11/2010 | Oyadomari et al. | |
| 7,921,686 B2 | 4/2011 | Bagepalli et al. | |
| 8,194,534 B2* | 6/2012 | Pandey et al. | 370/216 |
| 8,265,071 B2 | 9/2012 | Sindhu et al. | |
| 8,335,213 B2 | 12/2012 | Sindhu et al. | |
| 8,340,088 B2 | 12/2012 | Sindhu et al. | |
| 8,345,675 B1 | 1/2013 | Raghunath | |
| 8,358,660 B2 | 1/2013 | Pacella et al. | |
| 8,477,730 B2 | 7/2013 | Rajagopalan et al. | |
| 8,537,829 B2 | 9/2013 | Mehta | |
| 8,687,629 B1 | 4/2014 | Kompella et al. | |
| 8,773,999 B2 | 7/2014 | Campbell et al. | |
| 8,780,931 B2 | 7/2014 | Anantharam et al. | |
| 8,789,164 B2 | 7/2014 | Kamble et al. | |
| 2002/0001307 A1 | 1/2002 | Nguyen et al. | |
| 2002/0046271 A1 | 4/2002 | Huang | |
| 2002/0057018 A1 | 5/2002 | Branscomb et al. | |
| 2002/0080780 A1 | 6/2002 | McCormick et al. | |
| 2002/0116485 A1 | 8/2002 | Black et al. | |
| 2002/0141427 A1 | 10/2002 | McAlpine | |
| 2002/0165961 A1 | 11/2002 | Everdell et al. | |
| 2003/0120822 A1 | 6/2003 | Langrind et al. | |
| 2003/0126195 A1 | 7/2003 | Reynolds et al. | |
| 2003/0169748 A1* | 9/2003 | Weyman et al. | 370/401 |
| 2004/0031030 A1 | 2/2004 | Kidder et al. | |
| 2004/0119735 A1 | 6/2004 | Subbarao et al. | |
| 2005/0063354 A1* | 3/2005 | Garnett et al. | 370/351 |
| 2005/0089054 A1 | 4/2005 | Ciancaglini et al. | |
| 2005/0105538 A1* | 5/2005 | Perera et al. | 370/396 |
| 2005/0135357 A1 | 6/2005 | Riegel et al. | |
| 2005/0141499 A1* | 6/2005 | Ma et al. | 370/389 |
| 2005/0141523 A1 | 6/2005 | Yeh et al. | |
| 2005/0198247 A1 | 9/2005 | Perry et al. | |
| 2005/0198373 A1 | 9/2005 | Saunderson et al. | |
| 2006/0092832 A1 | 5/2006 | Santoso et al. | |
| 2006/0098672 A1 | 5/2006 | Schzukin et al. | |
| 2007/0083528 A1 | 4/2007 | Matthews et al. | |
| 2007/0121499 A1 | 5/2007 | Pal et al. | |
| 2007/0136458 A1 | 6/2007 | Boyd et al. | |
| 2007/0147279 A1* | 6/2007 | Smith et al. | 370/316 |
| 2007/0266384 A1* | 11/2007 | Labrou et al. | 718/100 |
| 2008/0170578 A1 | 7/2008 | Ould-Brahim | 370/401 |
| 2008/0275975 A1* | 11/2008 | Pandey et al. | 709/223 |
| 2009/0059957 A1* | 3/2009 | Bagepalli et al. | 370/469 |
| 2009/0129398 A1 | 5/2009 | Riegel et al. | |
| 2009/0157844 A1 | 6/2009 | Fionda et al. | |
| 2009/0157884 A1 | 6/2009 | Anderson et al. | |
| 2009/0198836 A1* | 8/2009 | Wittenschlaeger | 709/253 |
| 2009/0228418 A1 | 9/2009 | Ramesh et al. | |
| 2010/0061240 A1 | 3/2010 | Sindhu et al. | |
| 2010/0061241 A1 | 3/2010 | Sindhu et al. | |
| 2010/0061242 A1 | 3/2010 | Sindhu et al. | |
| 2010/0061367 A1 | 3/2010 | Sindhu et al. | |
| 2010/0061389 A1 | 3/2010 | Sindhu et al. | |
| 2010/0061391 A1 | 3/2010 | Sindhu et al. | |
| 2010/0061394 A1 | 3/2010 | Sindhu et al. | |
| 2010/0162036 A1 | 6/2010 | Linden et al. | |
| 2010/0169446 A1* | 7/2010 | Linden et al. | 709/206 |
| 2010/0182934 A1* | 7/2010 | Dobbins et al. | 370/254 |
| 2010/0214949 A1 | 8/2010 | Smith et al. | |
| 2010/0303086 A1 | 12/2010 | Bialkowski | |
| 2010/0315972 A1 | 12/2010 | Plotnik et al. | |
| 2011/0047467 A1 | 2/2011 | Porter | |
| 2011/0093574 A1 | 4/2011 | Koehler et al. | |
| 2011/0103259 A1 | 5/2011 | Aybay et al. | |
| 2011/0116376 A1 | 5/2011 | Pacella et al. | |
| 2011/0179315 A1 | 7/2011 | Yang | |
| 2011/0228669 A1* | 9/2011 | Lei et al. | 370/219 |
| 2011/0238816 A1 | 9/2011 | Vohra et al. | |
| 2012/0002670 A1 | 1/2012 | Subramanian et al. | |
| 2012/0020373 A1 | 1/2012 | Subramanian et al. | |
| 2012/0063464 A1 | 3/2012 | Mehta | |
| 2012/0155453 A1 | 6/2012 | Vohra et al. | |
| 2012/0170548 A1 | 7/2012 | Rajagopalan et al. | |
| 2012/0287926 A1 | 11/2012 | Anantharam et al. | |
| 2012/0294314 A1 | 11/2012 | Campbell et al. | |
| 2012/0297103 A1 | 11/2012 | Kamble et al. | |
| 2012/0324442 A1 | 12/2012 | Barde | |
| 2013/0060929 A1* | 3/2013 | Koponen et al. | 709/224 |
| 2013/0064102 A1 | 3/2013 | Chang et al. | |
| 2013/0088971 A1 | 4/2013 | Anantharam et al. | |
| 2013/0089089 A1 | 4/2013 | Kamath et al. | |
| 2013/0103817 A1* | 4/2013 | Koponen et al. | 709/223 |
| 2013/0107709 A1 | 5/2013 | Campbell et al. | |
| 2013/0107713 A1 | 5/2013 | Campbell et al. | |
| 2013/0142196 A1 | 6/2013 | Cors et al. | |
| 2013/0201875 A1 | 8/2013 | Anantharam et al. | |
| 2013/0235735 A1 | 9/2013 | Anantharam et al. | |
| 2013/0235762 A1 | 9/2013 | Anantharam et al. | |
| 2013/0235763 A1 | 9/2013 | Anantharam et al. | |
| 2013/0242999 A1 | 9/2013 | Kamble et al. | |
| 2013/0247168 A1 | 9/2013 | Kamble et al. | |
| 2013/0315233 A1 | 11/2013 | Kamble et al. | |
| 2013/0315234 A1 | 11/2013 | Kamble et al. | |
| 2014/0064105 A1 | 3/2014 | Anantharam et al. | |

FOREIGN PATENT DOCUMENTS

| | | |
|---|---|---|
| JP | 200971619 | 4/2009 |
| JP | 2009542053 | 11/2009 |

OTHER PUBLICATIONS

Aureglia, JJ, et al., "Power Backup for Stackable System", IP.com, Dec. 1, 1995, 5 pages.

Rogerio, Drummond, "Impact of Communication Networks on Fault-Tolerant Distributed Computing", IP.com, Apr. 20, 1986, 53 pages.

Ni, Lionel M., et al., "Switches and Switch Interconnects", Michigan State University, Jun. 1997; 8 pages.

Tate, J. et al., "IBM b-type Data Center Networking: Design and Best Practices Introduction", IBM Redbooks; Dec. 2010; 614 pgs.

"Control Plane Scaling and Router Virtualization", Juniper Netwowrks, 2010; 12 pages.

Allen, D., "From the Data Center to the Network: Virtualization bids to remap the LAN", Network Magazine, vol. 19, No. 2, Feb. 2004; 5 pages.

Ayandeh, Siamack, "A Framework for Benchmarking Performance of Switch Fabrics", 10th Annual International Conference on Telecommunication, IEEE Conference Proceedings, vol. 2, 2003; pp. 1650-1655.

Brey et al., "BladeCenter Chassis Management", IBM J. Res. & Dev. vol. 49, No. 6, Nov. 2005; pp. 941-961.

Cisco, "Chapter 4: Switch Fabric", Cisco CRS Carrier Routing System 16-Slot Line Card Chassis System Description, Cisco.com, accessed Jan. 2012; 6 pages.

(56) References Cited

OTHER PUBLICATIONS

Coti et al., "MPI Applications on Grids: a Topology Aware Approach", Euro-Par, Paralell Processing, Lecture Notes in Computer Science, 2009, University of Paris, Orsay, France; 12 pages.
International Search Report and Written Opinion in related international application No. PCT/IB2013/051339, mailed on May 21, 2013; 8 pages.
Kandalla et al., "Designing Topology-Aware Collective Communication Algorithms for Large Scale Infiniband Clusters: Case Studies with Scatter and Gather", IEEE International Symposium on Parallel & Distributed Processing, Workshops and PhD Forum, 2010; 8 pages.
Lawrence et al., "An MPI Tool for Automatically Discovering the Swtich Level Topologies of Ethernet Clusters", IEEE International Symposium on Paralell and Distributed Processing, Apr. 2008, Miami, FL; 8 pages.
Malavalli, Kumar, "High Speed Fibre Channel Switching Fabric Services", SPIE Conference on High-Speed Fiber Networks and Channels, Boston, MA (USA), Sep. 1991; 11 pages.
Shunsuke Fujita et al., Effect of application order of topology inference rule for Layer2 Network Topology visualizing System, IPSJ SIG Technical Reports, Feb. 26, 2009, vol. 2009, No. 21, p. 185-190. (Tanslation of abstract only.).
Takafumi Hamano et al., Packet forwarding control functions of an Open Architecture Router, IEICE Technical Report, Jun. 16, 2005, vol. 105, No. 127, p. 45-48. (Translation of abstract only.).
Teow, K., "Definitions of Managed Objects for the Fabric Element in Fibre Channel Standard (RFC2837)", IP.com, May 1, 2000; 41 pages.
Non-Final Office Action in related U.S. Appl. No. 13/453,644, mailed on Nov. 25, 2013; 16 pages.
Non-Final Office Action in related U.S. Appl. No. 14/072,941, mailed on Jul. 31, 2014; 19 pages.
Non-Final Office Action in related U.S. Appl. No. 13/453,644, mailed on Sep. 10, 2014; 26 pages.
Notice of Allowance in related U.S. Appl. No. 13/454,987, mailed on Sep. 23, 2014; 10 pages.
Examination Report in related United Kingdom Patent Application No. 1412787.2, mailed on Aug. 26, 2014; 3 pages.
Notice of Allowance in related U.S. Appl. No. 13/646,378, mailed on Oct. 9, 2014; 8 pages.
Notice of Allowance in related U.S. Appl. No. 13/414,677, mailed on Oct. 24, 2014; 9 pages.
Notice of Allowance in related U.S. Appl. No. 13/414,684, mailed on Oct. 24, 2014; 9 pages.
Non-Final Office Action in related U.S. Appl. No. 13/646,378, mailed on Apr. 15, 2014; 23 pages.
Non-Final Office Action in related U.S. Appl. No. 13/454,987, mailed on May 19, 2014; 16 pages.
Non-Final Office Action in related U.S. Appl. No. 12/414,677, mailed on May 20, 2014; 14 pages.
Non-Final Office Action in related U.S. Appl. No. 13/414,687, mailed on Jun. 4, 2014; 21 pages.
Final Office Action in related U.S. Appl. No. 13/453,644, mailed on May 21, 2014; 25 pages.
International Search Report & Written Opinion in related international patent application No. PCT/IB2013/050428, mailed on Jun. 20, 2013; 9 pages.
Notice of Allowance in related U.S. Appl. No. 13/646,378, mailed on Nov. 28, 2014; 7 pages.
Notice of Allowance in related U.S. Appl. No. 13/414,684, mailed on Dec. 3, 2014; 9 pages.
Notice of Allowance in related U.S. Appl. No. 13/414,677, mailed on Dec. 3, 2014; 10 pages.
Notice of Allowance in related U.S. Appl. No. 13/646,378, mailed on Dec. 31, 2014; 7 pages.
Notice of Allowance in related U.S. Appl. No. 14/072,941, mailed on Feb. 12, 2015; 7 pages.
Notice of Allowance in related U.S. Appl. No. 13/414,684, mailed on Mar. 3, 2015; 7 pages.
Notice of Allowance in related U.S. Appl. No. 13/414,677, mailed on Mar. 2, 2015; 7 pages.
Notice of Allowance in related U.S. Appl. No. 13/453,644, mailed on Feb. 27, 2015; 17 pages.
Notice of Allowance in related U.S. Appl. No. 13/454,987, mailed on Feb. 4, 2015; 7 pages.

* cited by examiner

DISTRIBUTED FABRIC MANAGEMENT PROTOCOL

FIELD OF THE INVENTION

The invention relates generally to data centers and data processing. More particularly, the invention relates to a set of protocols and software components for centralized management of a distributed fabric of independent network elements.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. A given data center can have hundreds or thousands of interconnected network elements, presenting an complex, arduous task to any network administrator responsible for configuring each network element individually and the distributed fabric system as a whole.

SUMMARY

In one aspect, the invention features a distributed fabric system comprising a plurality of independent network elements interconnected by inter-switch links and assigned to a same group. Each network element includes one or more switching chips, a processor, and memory storing layered program code that is executed by the processor. The layered program code of each network element includes a device configuration (DC) stacking module and a switch discovery protocol (SDP) module. The SDP module of each network element, when executed, discovers each other network element in the group and elects one of the network elements as a master network element. The SDP module of the master network element, when executed, sends messages to the DC stacking module of the master network element. Each sent message identifies one of the network elements in the group. The DC-stacking module of the master network element, when executed, maintains a record of all network elements that are currently members in the group.

In another aspect, the invention features a computer program product for managing a distributed fabric system in which a plurality of independent network elements are interconnected by inter-switch links. The network elements are assigned to a same group. The computer program product comprises a computer-readable storage medium having computer-readable program code embodied therewith. The computer-readable program code comprises a switch discovery protocol (SDP) module configured to discover each network element in the group and to elect one of the network elements as a master network element. The SDP module, when executed by the master network element, is further configured to issue a message for each network element in the group. A device configuration (DC) stacking module is configured to communicate switch information with each other network element in the distributed fabric system. The DC-stacking module, when executed by the master network element, is configured to receive each message issued by the SDP module running on the master network element and to maintain a record of all network elements that are currently members in the group.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Distributed fabric systems described herein include a plurality of interconnected independent network elements. Each of these network elements includes one or more switching chips for routing packets throughout the distributed fabric. Hereafter, such network elements may interchangeably be referred to as switches. These network elements communicate with each other in accordance with certain protocols. These protocols operate to group the switches together so that they can be centrally managed as a single virtual switch. One of the protocols is a switch discovery protocol (SDP), by which the network elements detect when a network element joins or leaves the distributed fabric system. The SDP also elects a master network element or controller. Another protocol is a device configuration (DC) stacking protocol, which the network elements use to exchange switch information with each other. On the master network element, the DC-stacking protocol is also configured to maintain a record of the network elements currently in the group. Through the master network element, a network administrator can communicate with remote network elements to obtain information collected by their switching chips, to set parameters of their switching chips, to configure the network element, and to install updated versions of their firmware. Accordingly, the master network element provides a central location by which to manage the various independent network elements within a distributed fabric system.

Figure 1:
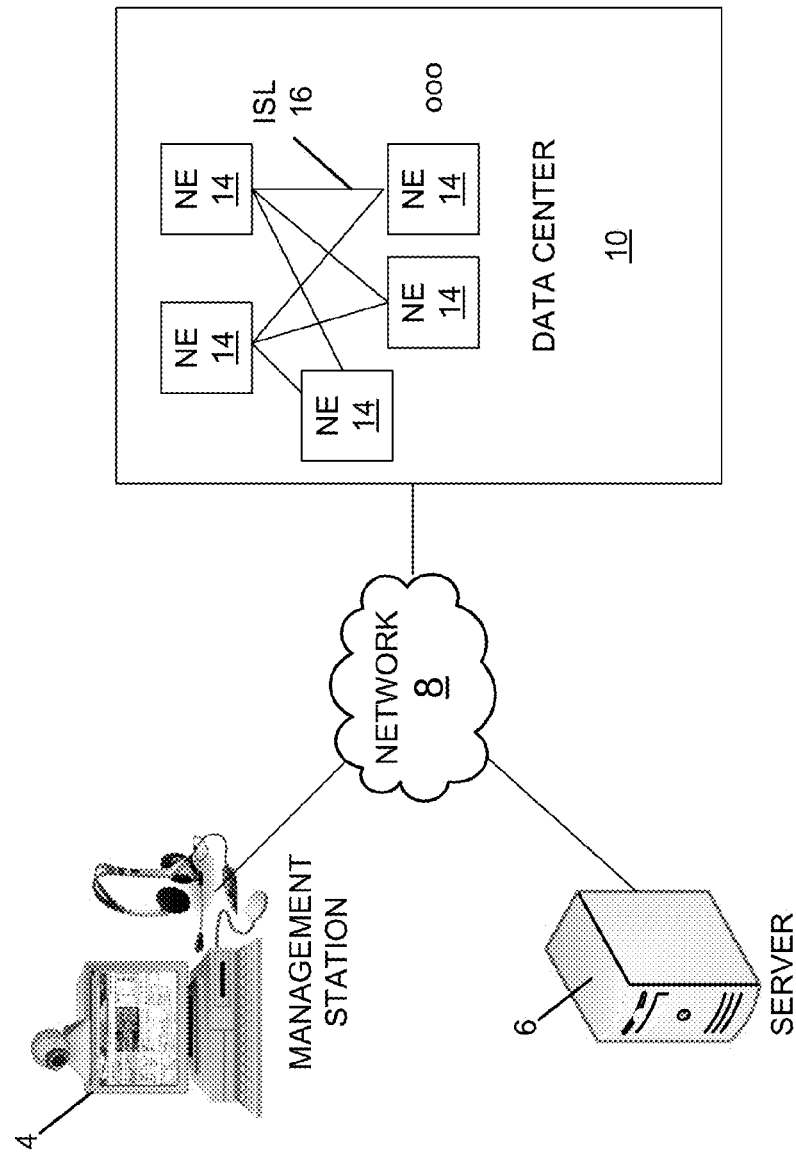
FIG. 1 is an embodiment of a networking environment including a data center with a plurality of network elements, a server, and a management station.

FIG. 1 shows an embodiment of a networking environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN. The data center 10 is generally a facility that houses various computers, routers, switches, and other associated equipment in support of applications and data that are integral to the operation of a business, organization, or other entities.

The data center 10 includes a plurality of network elements 14 in communication over inter-switch links (ISLs) 16. Each of the network elements 14 are independent (standalone) packet-based switches, configured together to form a single distributed fabric system, each designated as a member of a particular group (or cluster). Each group has a master (or controller) network element, one or more standby or back-up network elements, and one or more follower network elements, as described in more detail in connection with FIG. 2. The data center 10 can have more than one group, although each network element can be the member of one group only. Members of the same group share the same group ID (GID). Users can set the GID through the CLI (command-line interface); the default value is 0. Embodiments of the network elements 14 include, but are not limited to, core switches, access switches, fabric cards, line cards, and management modules in a physical chassis switch. Although only five network elements 14 are shown, the number of network elements in the distributed fabric system can range in the hundreds and thousands.

The data center 10 may be embodied at a single site or distributed among multiple sites. Although shown outside of the data center 10, either (or both) of the management station 4 and server 6 may be considered part of the data center 10. In the data center 10, the functionality occurs on three planes: a management plane, a control plane, and a data plane. The management of the group, such as configuration management, runtime configuration management, presentation of information (show and display), graph generation, and handling SNMP requests, occurs on the management plane. The control plane is associated with those functions involving network signaling and control. The data plane manages data flow. In the data center 10, the functionality of the management plane is centrally implemented at a master network element, as described further herein. The functionality of the control plane may be implemented predominately at the server 6 or be distributed among the network elements. In general, the functionality of the data plane is distributed among the network elements 14.

The management station 4 provides a centralized point of administration for managing and controlling the networked switches 14 of the distributed fabric system. Through the management station 4, a user or network administrator of the data center 10 communicates with the master network element in order to manage the group, with conceivably thousands of network elements, from a single location. A graphical user interface (GUI) application executing on the management station 4 can serve to provide the network administrator with a view of the entire network topology of the distributed fabric system. An example of such a GUI application is Blade Harmony Manager® provided by IBM Corporation of Armonk, N.Y.

In addition, the management station 4 can connect directly (point-to-point) or indirectly to the master network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11 (n)). Using a network protocol, such as Telnet or SNMP (Simple Network Management Protocol), the management station 4 can access a command-line interface of the given network element 14.

In general, the server 6 is a computer (or group of computers) that provides one or more services to the data center 10, examples of which include, but are not limited to, email servers, proxy servers, DNS servers, and a control server running the control plane of the distributed fabric system. To support the control plane functionality of an entire network element cluster, the server 6 is configured with sufficient processing power (e.g., with multiple processor cores).

Figure 2:
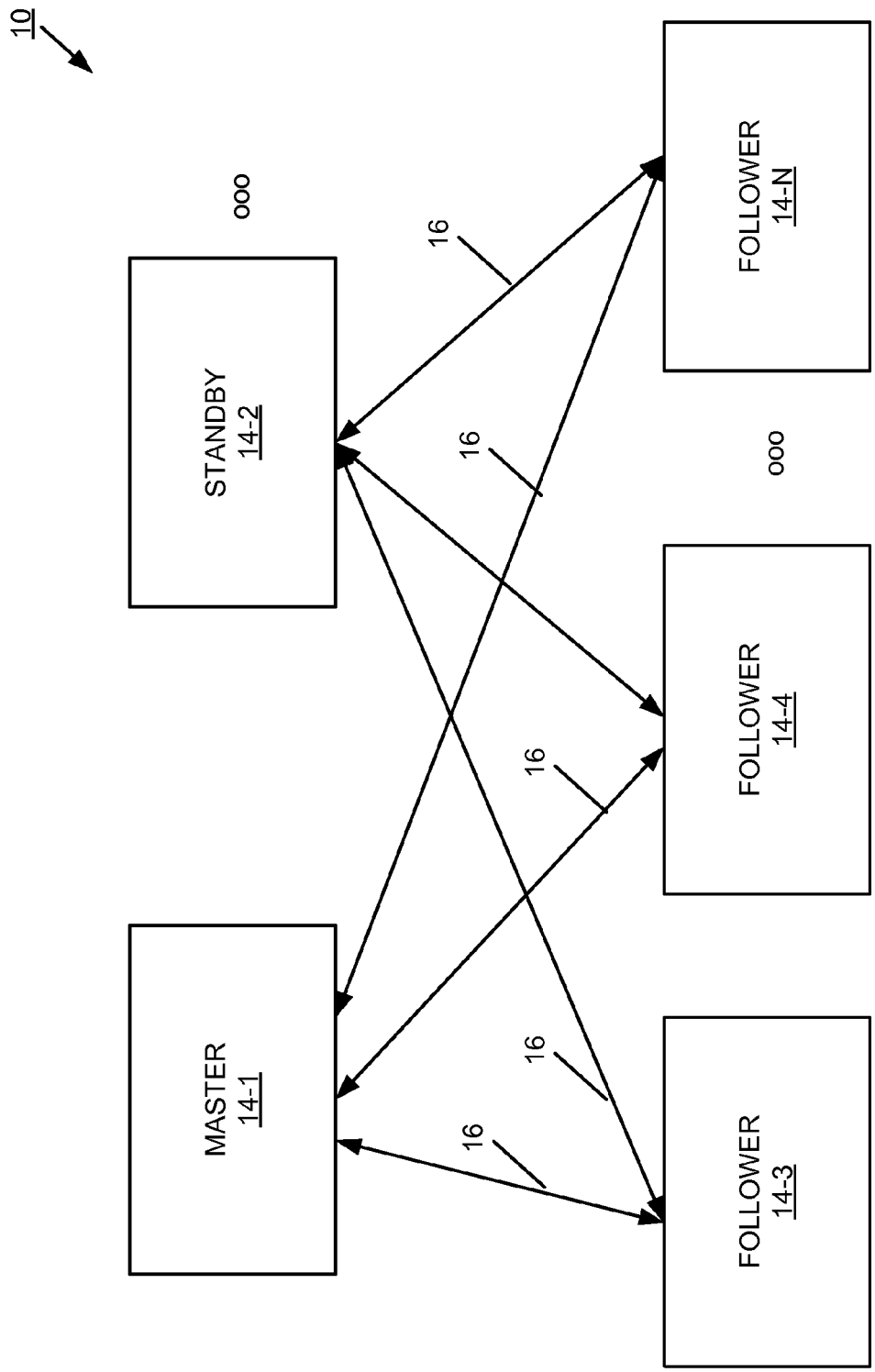
FIG. 2 is a block diagram of an embodiment of the data center including a master (controller) network element, a back-up network element, and a plurality of follower network elements.

FIG. 2 shows an embodiment of the data center 10 with the plurality of network elements 14 including a master (controller) switch 14-1, a backup (standby) switch 14-2, and a plurality of follower switches 14-3, 14-4, 14-N. In general, one of the network elements is chosen as the master switch 14-1, another is designated as the backup switch 14-2, and all other switches are followers. The master switch 14-1 is the control center for the entire distributed fabric system and the follower switch is any network element under the control of the master switch 14-1, the master switch 14-1 sending and receiving control plane and data plane packets to and from the follower network elements 14-3, 14-4, 14-N. Under normal operation of the distributed fabric system, the backup switch 14-2 operates like a follower switch, except that the backup switch 14-2 assumes master ownership should the current master switch fail.

The master switch 14-1 and backup switch 14-2 are each in communication with each of the follower switches 14-3, 14-4, 14-N over ISLs 16. Other interconnection configurations can be employed, such as daisy chain, full mesh, star, and stacked, without departing from the principles described herein. In one embodiment, the ISLs 16 over which the network elements 14 communicate are 10 Gb Ethernet links (the network elements 14 communicating according to the IEEE 802.Qgb standard).

Applications in such a distributed fabric system preferably have three modes: a master mode, a backup mode, and a member mode. Depending upon the role of a given network element, applications running on that network element run in the corresponding mode. For example, applications running on the master switch 14-1 run in the master mode. Each application can take a different approach and, thus, take different responsibilities in the different modes. Example implementations of these applications include a purely centralized approach, a fully distributed approach, or a combination of centralized and distributed approaches. Applications running on a network element have a global view of all the data ports on all network elements in the distributed fabric system.

Figure 3:
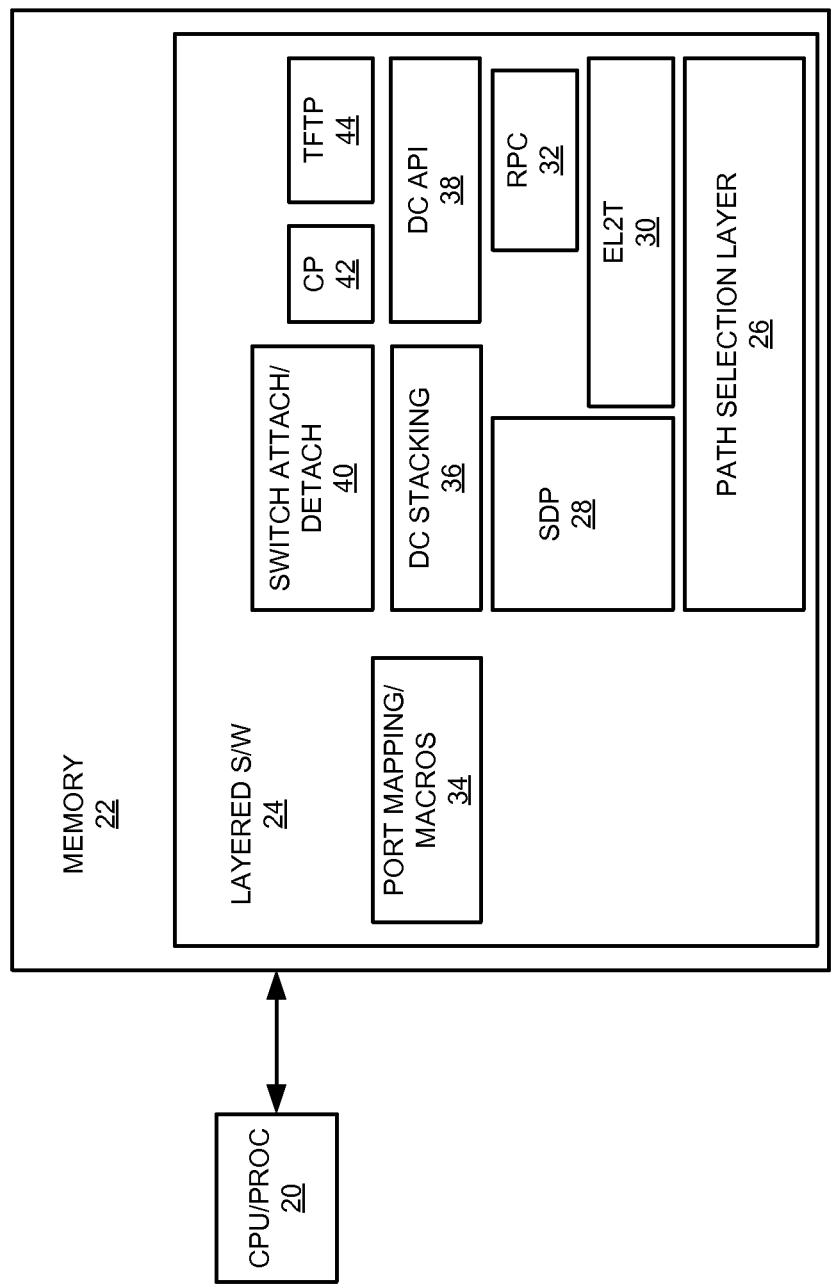
FIG. 3 is a functional block diagram of an embodiment of a network element including a processor in communication with memory, and layered software stored in the memory.

FIG. 3 shows a simplified embodiment of a network element 14 including a processor 20 in communication with memory 22, and layered software 24 stored in the memory 22. The layered software 24 includes a set of software components common to each of the network elements 14. In brief, the set of software components includes protocols for grouping the multiple network elements 14 together to form a single large switch. By implementing the protocols provided by this set of software components, referred to herein as M-DFP or Management Distributed Fabric Protocol, the group of network elements can be connected to form a stacked switch, a virtual switch, or a distributed chassis switch. This set of software components can also serve to implement a physical chassis switch. In general, the M-DFP software components reside in the software stack 24 between those applications on a network element and the SDK (software development kit) on a system. An SDK includes runtime tools, such as the Linux kernel, development tools, software libraries, and frameworks.

The layered software stack 24 includes a path selection layer 26, a switch discovery protocol (SDP) module 28, an EL2T (Ethernet-based L2 Transport) layer 30, an RPC (Remote Procedure Call) module 32, a port mapping/macros module 34, a DC-stacking module 36, DC APIs (application program interface) 38, a switch attach/detach module 40, a CP (check point) module 42, and a TFTP (Trivial File Transfer Protocol) module 44. The communications required to implement M-DFP among the network elements 14 can run on top of standard Ethernet links, a fabric connection, or any proprietary bus.

In brief overview, the path selection layer (PSL) 26 facilitates CPU-to-CPU communications in support of the SDP and EL2T modules 28, 30. The SDP module 28 and the PSL 26 cooperate to determine the egress port by which a packet is sent from the network element to a remote network element. The PSL 26 includes a driver interface to both socket and data ports.

The SDP module 28 discovers when switches join and leave the group, referred to as switch-found and switch-gone events, respectively. Detecting the departure of a switch can be achieved using an age-out mechanism. Link-down events on the ISLs 16 can also trigger switch-gone detection under some conditions. The SDP module 28 reports switch-found (JOIN_STACK) and switch-gone (LEAVE_STACK) events to the DC-stacking module 36 on the same network element for further processing. Other functions of the SDP module 28 are to check the health of ISLs 16 for all possible paths between the local network element and other remote network elements, and to provide a priority-based master-election mechanism.

The EL2T layer 30 provides a simple L2 transport protocol to facilitate communications by the upper layer protocols above the EL2T layer 30. In one embodiment, these upper layer protocols include the RPC module 32, the DC-stacking module 36, the CP module 42, the TFTP module 44, and all applications on the network element 14.

The RPC module 32 provides an RPC mechanism that is based on EL2T layer 30, and used by DC-API layer 38 on the master switch 14-1 to communicate with a remote network element.

The port mapping/macros module 34 provides applications on the top of the layered software with a mapping from a global CLI port to a physical device and a port. In cooperation with the DC-stacking module 36 and the SDP module 28, the port mapping/macros module 34 maintains the mapping.

The DC-stacking module 36 uses data structures to form a "stack" of the network elements in the same group, coordinating the network elements such that they cooperate as a single switch. The DC-stacking module 36 of all network elements in the same group communicate with each other using the EL2T module 30 for information exchange and for stack formation. In addition, the DC-stacking module 36 on different network elements work together to make sure the master switch 14-1 has up-to-date information for existing network elements (through HOST-UPDATE events). A HOST-UPDATE event is passed to the DC-stacking module 36 to provide an information update whenever the switch information for a given network element has changed and the DC-stacking module 36 has already received a JOIN-STACK event for that given network element.

Through the DC-API layer 38, applications running on the network element 14 can make program calls to the hardware switching chips of the network element, either to retrieve information from the chips or to set some parameters on the chips. These chips may reside either on the local network element or on a remote network element.

The switch attach/detach module 40 notifies applications on the network element of changes on the network element, thus providing applications at the top of the layered software stack 24 with a global view of all data ports on all network elements in the group.

The CP module 42 assists applications running on the master switch 14-1 to synchronize each relevant database and states with the backup switch 14-2 in preparation for a backup-to-master failover.

The TFTP module 44 provides a transport layer on top of the EL2T layer 30 to assist the DC-stacking module 36 and applications to push either a configuration or a firmware image from the master switch 14-1 to any follower switch 14-3, 14-4, 14-N.

Figure 4B:
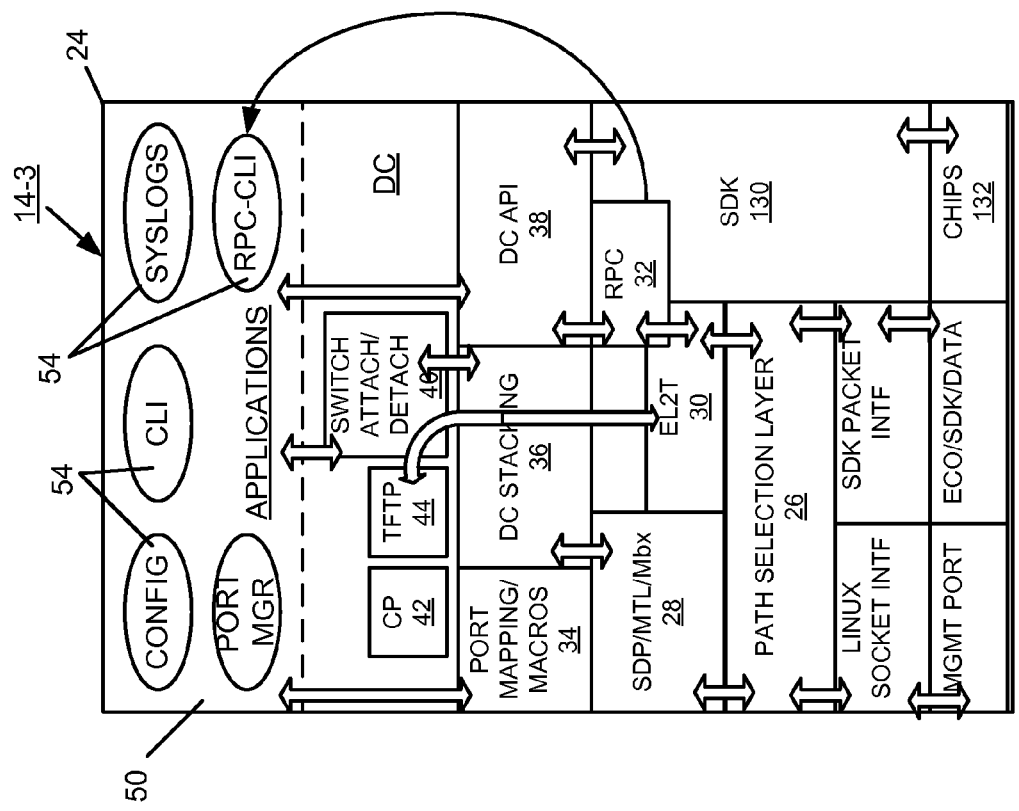
FIG. 4B is a block diagram of the layered software in a follower network element and various communication channels between layers of the software.
Figure 4A:
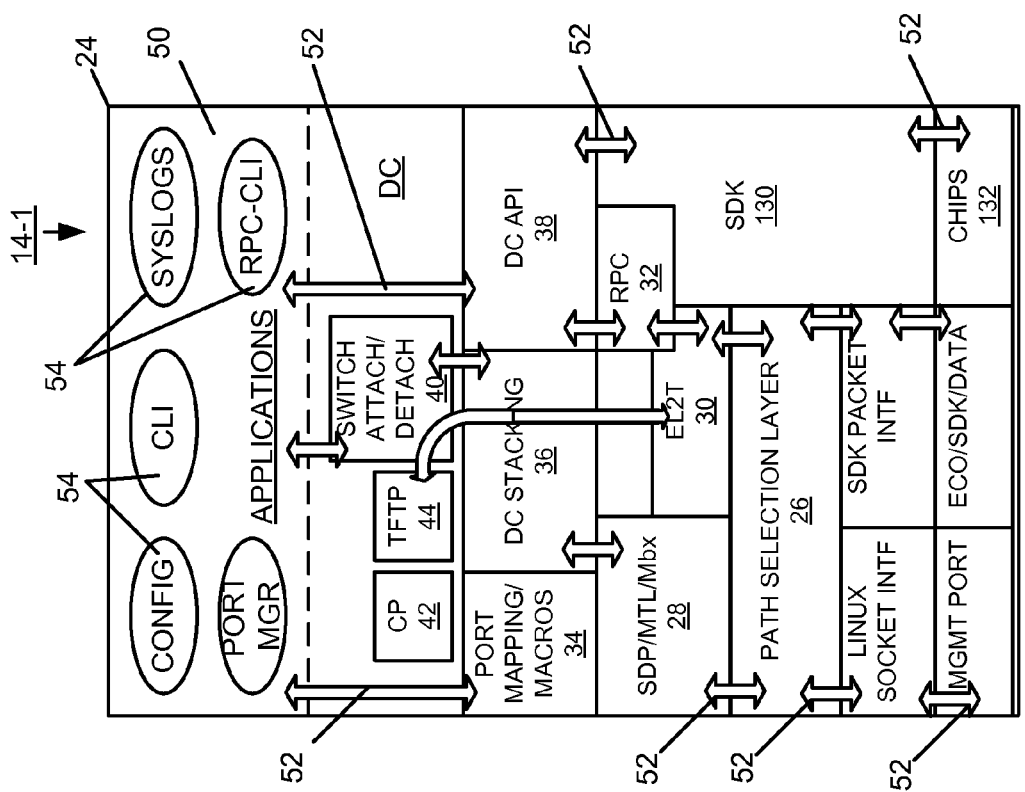
FIG. 4A is a block diagram of the layered software in a master network element and various communication channels between layers of the software.

FIG. 4A and FIG. 4B show software stacks 24 in a master switch 14-1 and in a follower switch 14-3 (as a representative example), respectively. Here, each software stack 24 includes an application layer 50 with various applications 54, examples of which include a config application, a CLI application, and a syslogs application. Double-ended arrows 52 represent control flows between components in the software stack 24.

In the layered software stack 24, the SDP module 28 is disposed between the DC-stacking module 36 above and the path selection layer 26 below. The SDP module 28 includes a switch discovery protocol (SDP), a member tracking layer (MTL), and a Path Health Maintenance (PHM) component. SDP is a multicast protocol, running in a common L2 VLAN, used for discovery of switches in the distributed fabric system. After a switch receives a packet for SDP, related switch information is passed into the MTL for maintenance of membership. Such packets are referred to as switch discovery protocol data units or SDPDUs.

The MTL is a database layer of the SDP module 28 for tracking the current network element members in the same group and for maintaining switch information for all such members. The switch information for each network element includes: the switch number, the MAC address of the switch, switch information (SI) and switch member (SM) sequence numbers, and a timestamp of the last SDPDU received from a remote network element. Any changes to the switch information is reported to MTL for tracking. When an ISL 16 goes down, the switch information learned over that link is cleared in the MTL. To help detect a switch-gone event, the MTL implements an age-out mechanism, using timers to "age out" a remote network element if no SDPDU is received from that network element for a specified duration. The MTL also elects the master network element of a group based on switch priorities (carried in the SDPDUs of the network elements). After the election, the elected master network element reports the switch member information to the DC-stacking module 36 of the master network element. In addition, the MTL of the master network element passes a message to the DC-stacking module 36 to notify of any change in switch membership in the group, whether resulting from a newly discovered switch or a from detecting a switch departure.

The PHM component of the SDP module 28 maintains the health states of all possible paths between the local network element and all other remote network elements. When an SDPDU is received from a network element, the health states for that network element are also updated in the MTL. The EL2T 30 and PSL 26 use this health information to determine the path or port used for communication between the local network element and a remote network element.

Figure 5:
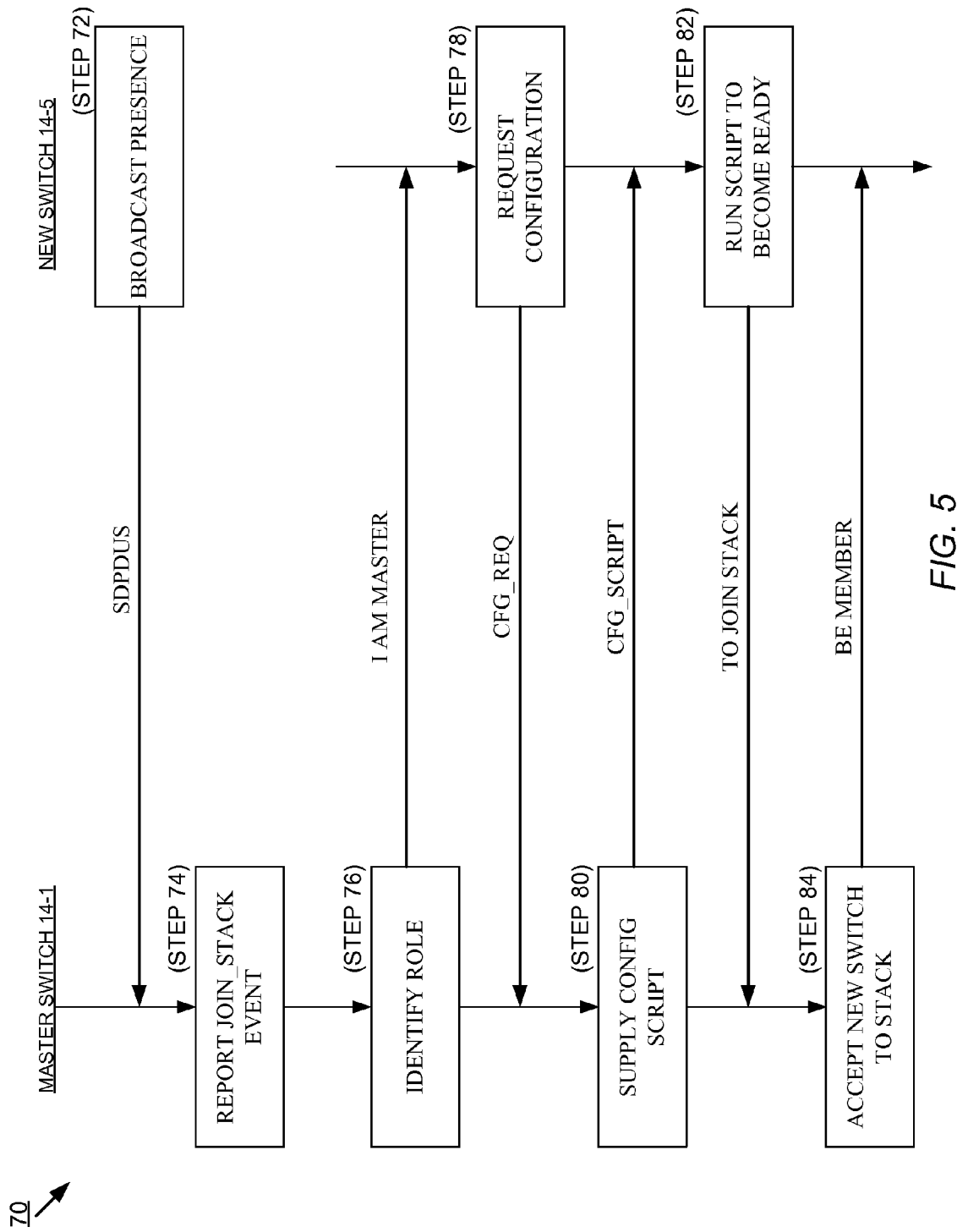
FIG. 5 is a flow diagram of an embodiment of a process for adding a new network element to the group of network elements.

FIG. 5 shows an embodiment of a process 70 by which a new switch 14-5 joins a stack (or group, cluster). After reboot, the new switch 14-5 periodically transmits (step 72) SDPDUs over its ISL ports. In response to receiving an SDPDU from the new switch 14-5, the SDP module 28 on the master switch 14-1 reports (step 74) a JOIN_STACK event to the DC-stacking module 36 for processing. In response to this JOIN_STACK message, the DC-stacking module 36 communicates with the DC-stacking module 36 on the new switch 14-5, seeking to perform an information exchange.

During the information exchange, the master switch 14-1 identifies itself by sending (step 76) an I_AM_MASTER message to the DC-stacking module 36 of the new switch 14-5. The I_AM_MASTER message preferably includes a signature that denotes the current configuration of the master switch 14-1. The new switch 14-5 responds to the message by sending (step 78) a request for configuration (CFG_REQ) to the master switch 14-1. In response to this CFG_REQ message, the master switch 14-1 sends (step 80) a configuration script to the new switch 14-5 to be run by the switch 14-5 in order to join the stack. The configuration script implements the user configuration set through the CLI. An example configuration performed by running the configuration script is to set which VLANs are allowed at a given port. After completing the script, the new switch 14-5 returns (step 82) a message to join the stack. Subsequently, the master switch 14-1 notifies the new switch 14-5 of its acceptance into the stack by sending (step 84) a BE_MEMBER message. After the new switch 14-5 joins the stack, the master switch 14-1 can manage and control the new switch 14-5.

Before the new switch 14-5 can join the stack, the image (i.e., firmware) on the new switch 14-5 needs to be compatible with the image running on the master switch 14-1. Verification of compatibility can occur in response to the I_AM_MASTER and CFG_REQ messages. Based on information carried by the CFG_REQ message, the master switch 14-1 can learn the revision number of the image running on the new switch 14-5. If the master switch 14-1 determines that the images are not compatible, the master switch 14-1 pushes a compatible version of firmware to the new switch 14-5.

Figure 6:
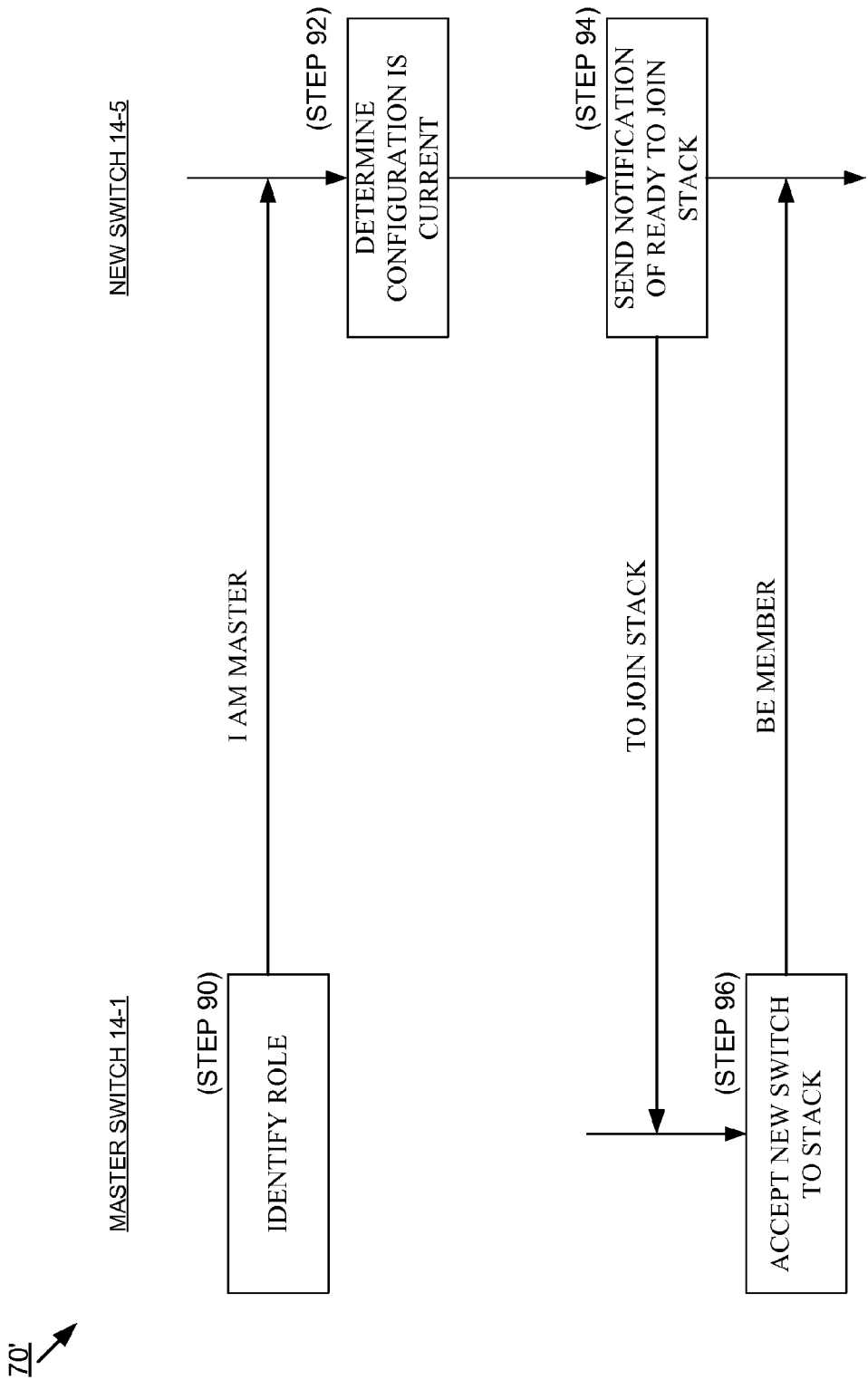
FIG. 6 is a flow diagram of another embodiment of a process for adding a new network element to the group of network elements.

FIG. 6 shows an abbreviated version 70' of the process 70 of FIG. 5 by which a new switch 14-5 joins a stack (or group, cluster). As in the process 70 of FIG. 5, the master switch 14-1 identifies itself by sending (step 90) an I_AM_MASTER message to the new switch 14-5 in response to receiving an SDPDU from the new switch 14-5. In the abbreviated version, a quick join can occur if the new switch 14-5 already has the same configuration as the master switch 14-1. Each of the messages carries additional information to facilitate this determination. For example, the I_AM_MASTER message includes a signature that denotes the current configuration of the master switch 14-1. From this signature, the new switch determines (step 92) that it has the same configuration as the current configuration of the master switch 14-1. Accordingly, instead of issuing a CFG_REQ message (step 78, FIG. 5), the new switch 14-5 advances to sending (step 94) TO_JOIN_STACK message to indicate readiness to join the stack. In response, the master switch 14-1 accepts the new switch 14-5 to the stack by sending (step 96) the BE_MEMBER message to the new switch 14-5. This "quick join" process can accelerate the process of adding a new switch to a stack, thereby helping to stabilize the distributed fabric system by shortening the time when the ISL is unstable. For example, a mistakenly unplugged ISL after being reconnected is momentarily unstable.

Figure 7:
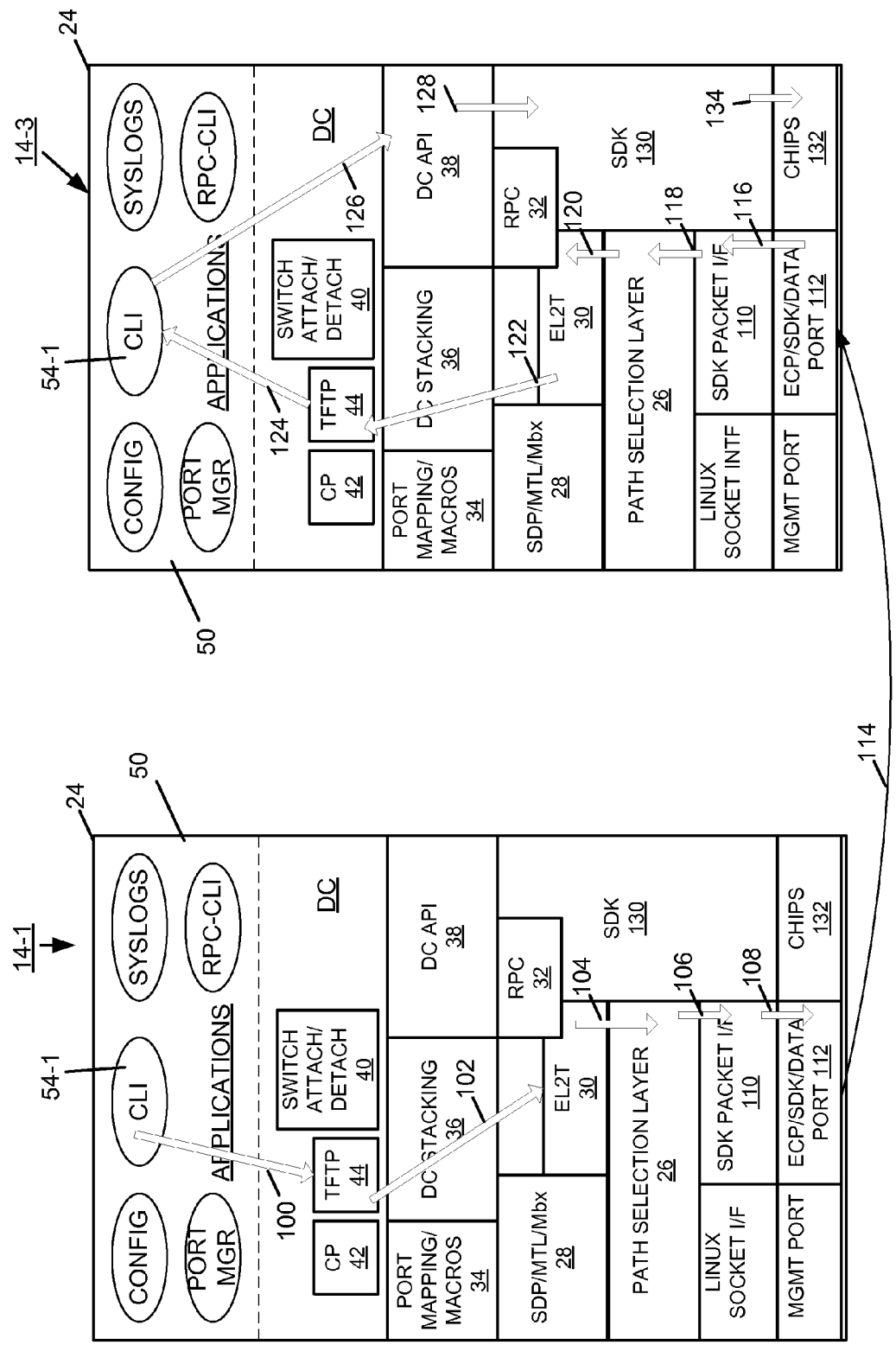
FIG. 7 is a diagram of an example of a control flow through the layered software of the master and follower network elements for applying a configuration to the follower network element.

FIG. 7 shows an example of the control flow through the layered software 24 of the master switch 14-1 and follower switch 14-3 when, for example, a network administrator desires to apply a configuration to the follower switch 14-3. From the management station 4 (FIG. 1), the network administrator connects to and communicates with the master switch 14-1 through command line interface (CLI) 54-1 application.

Usually, a CLI script maintains a user configuration, and the master switch 14-1 pushes the CLI script to the follower switch 14-3. To push the CLI script, the CLI application 54-1 communicates (arrow 100) with the TFTP module 44 to prepare the CLI script file for transfer to the remote follower switch 14-3. The TFTP module 44 calls (arrow 102) the EL2T layer 30. From the EL2T layer 30, the packet processing proceeds (arrow 104) to the path selection layer 26, which determines the egress port over which to send packets to the follower switch 14-3. The path selection layer 26 communicates (arrow 106) with the SDK packet interface 110, which interfaces (arrow 108) with the appropriate data port 112 through which to send the packets. The packets with the CLI script traverse (arrow 114) an ISL link 16 to the follower switch 14-3.

At the follower switch 14-3, the packet processing moves upwards through the layers of the software stack 24, in reverse order from that taken by the master switch 14-1 when preparing the packets for transmission. More specifically, the packets pass upwards from the data port 112 to the SDP packet interface 110 (arrow 116), then to the path selection layer 26 (arrow 118), the EL2T layer 30 (arrow 120), and the TFTP module 44 (arrow 122), then from the TFTP module 44 to the CLI application 54-1 (arrow 124), which acquires and runs the CLI script file in order to apply the user configuration.

Execution of the CLI script produces (arrow 126) calls to the DC API 38. The DC API 38 calls (arrow 128) the SDK 130 associated with the switching chips 132 on the follower switch 14-3. The SDK 130 operates to configure (arrow 134) the chips 132 in accordance with the CLI script running at the application layer 50.

Figure 8:
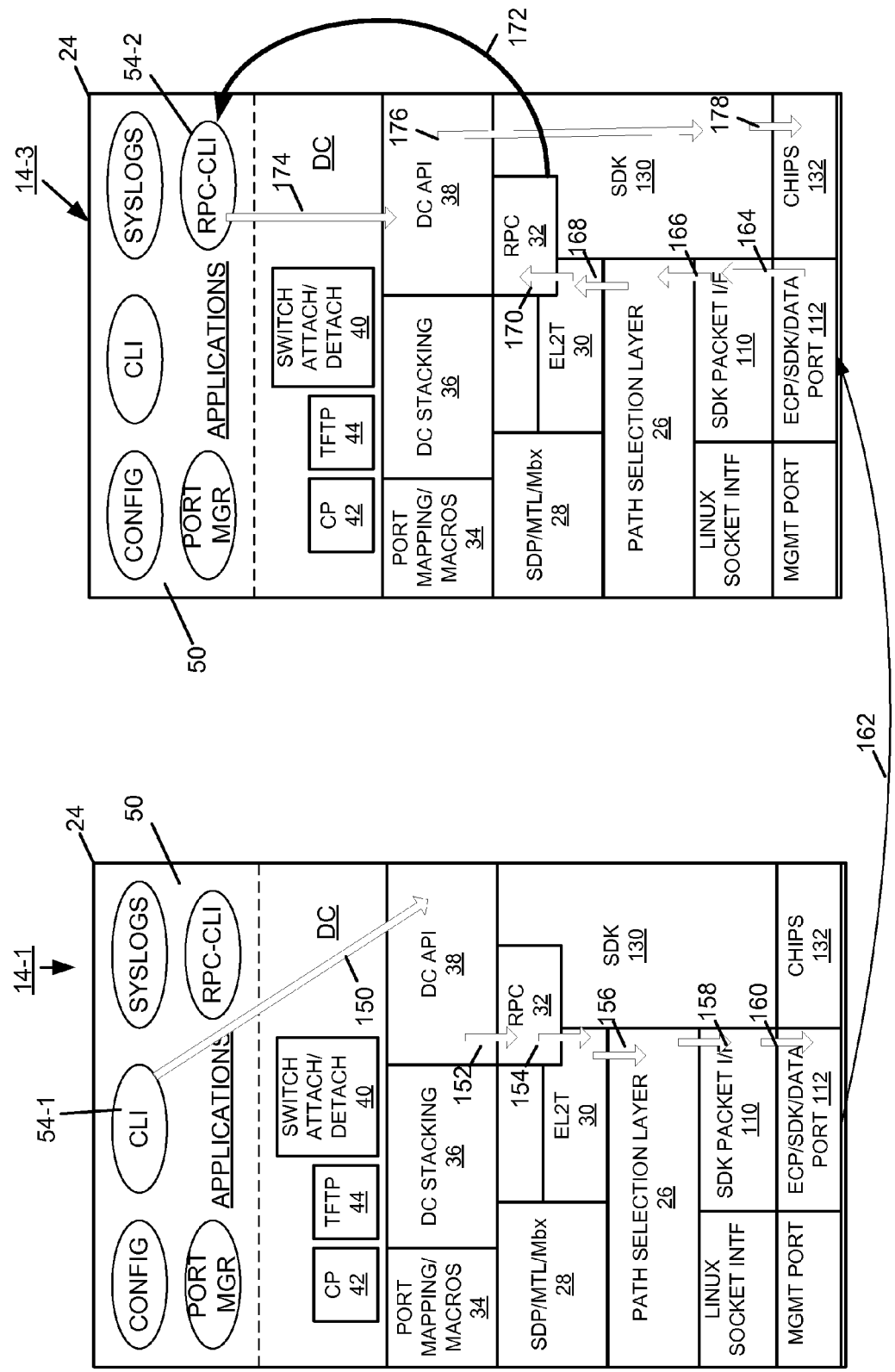
FIG. 8 is a diagram of an example of a control flow through the layered software of the master and follower network elements for collecting information from a follower network element using an RPC call.

FIG. 8 shows an example of the control flow through the layered software 24 of the master switch 14-1 and follower switch 14-3 when, for example, a network administrator desires to collect information from a switching chip 132 or to manage a data port on a follower switch 14-3. The network administrator connects to the master switch 14-1 from the management station 4 and communicates with the master switch 14-1 through the CLI 54-1 application.

In brief overview, to gather the requested information or to manage the data port, the master switch 14-1 issues an RPC call that is received and processed by the follower switch 14-3. More specifically, the packet processing moves downward through the software stack 24 of the master switch 14-1, from the CLI application 54-1 to the DC API 38 (arrow 150), and from the DC API 38 to the RPC module 32 (arrow 152). The RPC module 32 calls (arrow 154) the EL2T layer 30, the EL2T layer 30 calls (arrow 156) the path selection layer 26, and the path selection layer 26 communicates (arrow 158) with the SDK packet interface 110. The SDK packet interface 110 interfaces (arrow 160) with the appropriate data port 112 through which to send the packets. The packets containing the RPC call travel (arrow 162) an ISL link 16 to the follower switch 14-3.

As described in connection with FIG. 7, the packet processing at the follower switch 14-3 moves upwards through the layers of the software stack 24 in reverse order from the path taken downwards through the software stack when the master switch 14-1 prepared the RPC call packets for transmission. The packets pass upwards from the data port 112 to the SDP packet interface 110 (arrow 164), then to the path selection layer 26 (arrow 166), then to the EL2T layer 30 (arrow 168), then from EL2T layer 30 to the RPC module 32 (arrow 170). The RPC module 32 calls (arrow 172) the RPC-CLI application 54-2. The RPC-CLI application 54-2 performs the operation specified by the RPC call by issuing (arrow 174) a call to the DC API 38. In response to this call, the DC API 38 calls (arrow 176) the SDK 130 associated with the switching chips 132. The SDK 130 issues (arrow 178) a command to the chips 132, for example, to configure a port of the chips 132 or to collect information from the chips 132.

Figure 9:
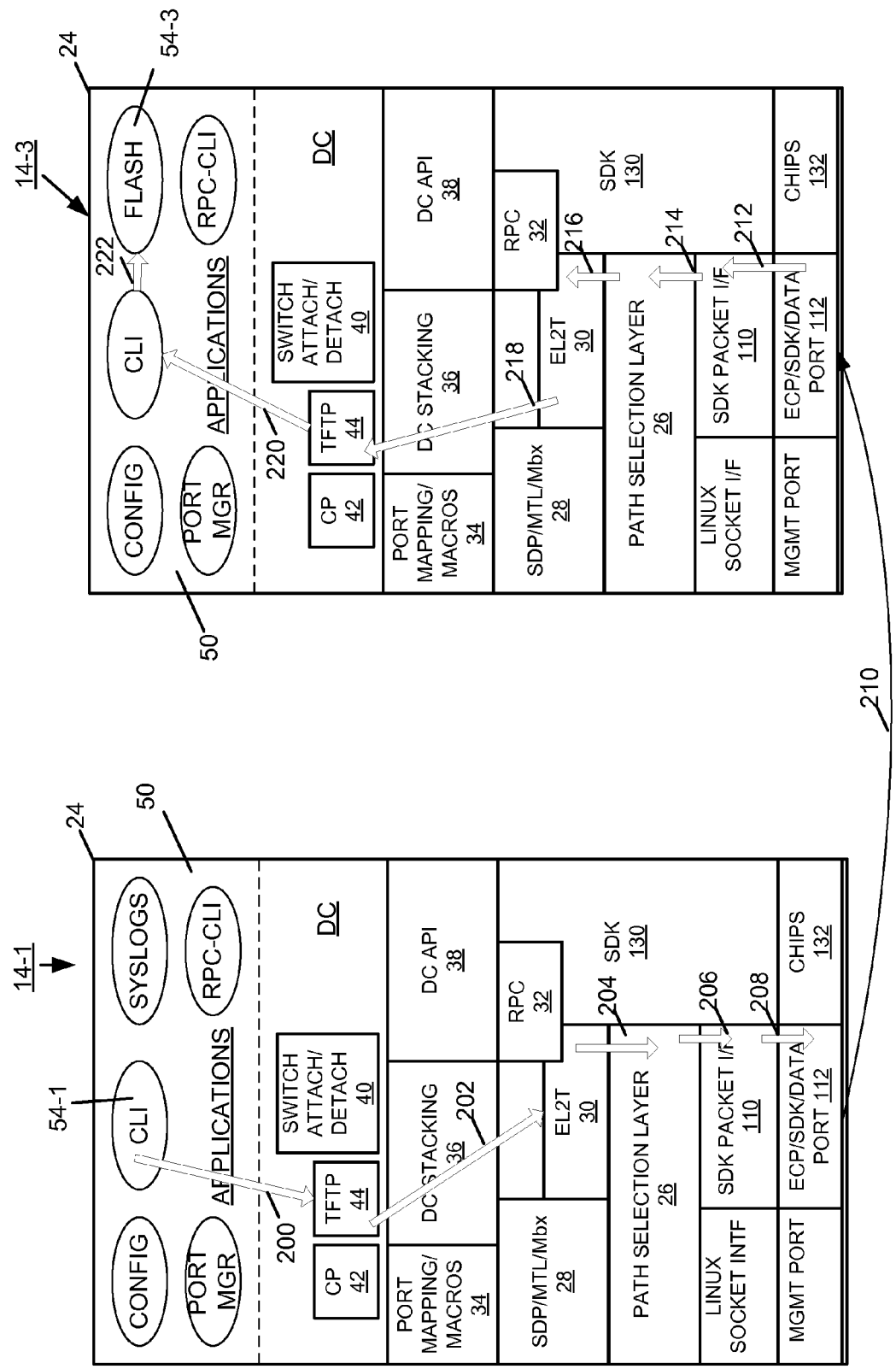
FIG. 9 is a diagram of an example of a control flow through the layered software of the master and follower network elements for upgrading firmware in a follower network element.

FIG. 9 shows an example of the control flow through the layered software stacks 24 of the master switch 14-1 and follower switch 14-3 when, for example, a network administrator desires to upgrade the firmware in the follower switch 14-3. To implement a firmware upgrade, the network administrator connects to the master switch 14-1 from the management station 4 and sends the new firmware to the master switch 14-1. Through the CLI 54-1 of the master switch 14-1, the network administrator can perform the firmware upgrade of any follower switch without having to connect to any network element other than the master switch 14-1.

To send the firmware upgrade to the remote follower switch, the CLI application 54-1 sends the file containing the firmware upgrade along a similar path, downward through the software stack, as that taken by the CLI script during the remote configuration described in FIG. 7. The firmware upgrade passes (arrow 200) to the TFTP module 44 to prepare the firmware upgrade file for transfer to the remote follower switch 14-3. The TFTP module 44 calls (arrow 202) the EL2T layer 30. From the EL2T layer 30, the packet processing proceeds (arrow 204) to the path selection layer 26. The path selection layer 26 communicates (arrow 206) with the SDK packet interface 110, which interfaces (arrow 208) with a data port 112 through which to send the packets. The packets with the firmware upgrade traverse (arrow 210) an ISL link 16 to the follower switch 14-3.

At the follower switch 14-3, the packet processing moves upwards through the layers of the software stack, in reverse order from that taken by the master switch 14-1 when preparing the firmware upgrade for transmission. The packets pass upwards from the data port 112 to the SDP packet interface 110 (arrow 212), then to the path selection layer 26 (arrow 214), the EL2T layer 30 (arrow 216), and the TFTP module 44 (arrow 218), then from the TFTP module 44 to the CLI application 54-1 (arrow 220). The CLI application 54-1 reprograms (arrow 222) the flash 54-3 (i.e., non-volatile memory) to contain the firmware upgrade.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A distributed fabric system comprising a plurality of independent network elements interconnected by inter-switch links (ISLs) and assigned to a same group, each network element including one or more switching chips, a processor, and memory storing layered program code that is executed by the processor, the layered program code of each network element including a device configuration (DC) stacking module and a switch discovery protocol (SDP) module that includes a member tracking layer (MTL) component, the SDP module of each network element, when executed, discovering each other network element in the group, the MTL component of each network element electing one of the network elements as a master network element, the SDP module of the master network element, when executed, sending messages to the DC stacking module of the master network element, each sent message identifying one of the network elements in the group, the DC-stacking module of the master network element, when executed, maintaining a record of all network elements that are currently members in the group, wherein:

the master network element receives a switch discovery protocol data unit (SDPDU) from a remote network element that is not a member of the group and sends, in response to receiving the SDPDU from the remote network element, a message to the remote network element by which the master network element identifies itself to the remote network element as master of the group;

the remote network element, after receiving the message from the master network element by which master network element identifies itself, determines whether the remote network element is ready to join the group; and the MTL component of the master network element maintains switch information about all network elements that are currently members in the group learned over the ISLs, employs a timer to age out the remote network element if no SDPDU is received from the remote network element for a specified duration, clears switch information learned over a given ISL when the given ISL goes down, and sends a message to the DC-stacking module of the master network element to notify of any change in membership in the group resulting from a newly discovered network element or from a departure of a network element.

2. The distributed fabric system of claim 1, wherein the layered program code of each network element further comprises application programs at a top layer of the layered program code and a DC-API (application program interface) module at a layer beneath the top layer, the DC-API module of each network element being configured to obtain information from and to set parameters of the one or more switching chips of any one of the network elements.

3. The distributed fabric system of claim 2, wherein the layered program code of each network element further comprises a Remote Procedure Call (RPC) module configured to be called by the DC-API module of that network element to communicate with one of the other network elements.

4. The distributed fabric system of claim 1, wherein the layered program code of each network element further comprises an Ethernet based L2 Transport (EL2T) to facilitate communication.

5. The distributed fabric system of claim 4, wherein the layered program code of each network element further comprises a path selection layer (PSL) at a layer below the SDP module and the EL2T layer, the PSL being configured to determine an egress port for a packet when transmitted over an inter-switch link to a remote network element.

6. The distributed fabric system of claim 4, wherein the layered program code of each network element further comprises a trivial file transfer protocol (TFTP) at a layer above the EL2T layer, the master network element using the TFTP to push a configuration and a firmware image to the other network elements.

7. The distributed fabric system of claim 1, wherein the layered program code of each network element further comprises a check-point module (CP) to synchronize applications on the master network element with related databases and states at a backup network element in preparation for a backup-to-master failover.

8. The distributed fabric system of claim 1, wherein the layered program code of each network element further comprises applications at a top layer of the layered program code and a switch attach/detach module configured to provide the applications with a global view of all data ports on all the network elements in the group and to notify the applications of any change on any of the network elements.

9. The distributed fabric system of claim 1, wherein the layered program code of each network element further comprises applications at a top layer of the layered program code and a port mapping/macros module configured to provide the applications with a mapping of a global CLI (command line interface) port to a physical device and a port.

10. The distributed fabric system of claim 1, further comprising sending, by the master network element, a remote procedure call to the remote network element to set a parameter of a hardware switching chip of the remote network element.

11. The distributed fabric system of claim 1, further comprising sending, by the master network element, a remote procedure call to the remote network element to configure a port of a hardware switching chip of the remote network element.

12. The distributed fabric system of claim 1, further comprising sending, by the master network element, a remote procedure call to the remote network element to request information from a hardware switching chip of the remote network element.

13. The distributed fabric system of claim 1, wherein the remote network element determines whether the remote network element is ready to join the group by determining that the remote network element has a same configuration as the master network element.

14. The distributed fabric system of claim 1, wherein the remote network element determines whether the remote network element is ready to join the group by:
   requesting a configuration script from the master network element in response to the message by which the master network element identifies itself to the remote network element as master of the group; and
   executing the configuration script.

15. A computer program product for managing a distributed fabric system in which a plurality of independent network elements are interconnected by inter-switch links (ISLs), the network elements being assigned to a same group, the computer program product comprising:
   a non-transitory computer-readable storage medium having computer-readable program code embodied therewith, the computer-readable program code comprising:
   switch discovery protocol (SDP) module configured to discover each network element in the group, the SDP module including a member tracking layer (MTL) component configured to elect one of the network elements as a master network element, the MTL component of the master network element maintaining switch information about all network elements that are currently members in the group learned over the ISLs and clearing switch information learned over a given ISL when the given ISL goes down, the SDP module, when executed by the master network element, being further configured to issue a message for each network element in the group; and
   a device configuration (DC) stacking module configured to communicate switch information with each other network element in the distributed fabric system, the DC-stacking module, when executed by the master network element, being configured to receive each message issued by the SDP module running on the master network element and to maintain a record of all network elements that are currently members in the group,
   wherein:
   the master network element is configured to receive a switch discovery protocol data unit (SDPDU) from a remote network element that is not a member of the group and to send, in response to receiving the SDPDU from the remote network element, a message to the remote network element by which the master network element identifies itself to the remote network element as master of the group;
   the remote network element is configured to, after receiving the message from the master network element by which master network element identifies itself, determine whether the remote network element is ready to join the group; and
   the MTL component of the master network element employs a timer to age out the remote network element if no SDPDU is received from the remote network element for a specified duration and sends a message to the DC-stacking module of the master network element to notify of any change in membership in the group resulting from a newly discovered network element or from a departure of a network element.

16. The computer program product of claim 15, wherein the computer-readable program code further comprises application programs at a top layer of a software stack and a DC-API (application program interface) module at a layer beneath the top layer, the DC-API module being configured to obtain information from and to set parameters of the one or more switching chips of any one of the network elements.

17. The computer program product of claim 16, wherein the computer-readable program code further comprises a Remote Procedure Call (RPC) module configured to be called by the DC-API module to communicate with a remote network element.

18. The computer program product of claim 15, wherein the computer-readable program code further comprises an Ethernet based L2 Transport (EL2T) to facilitate communication with a remote network element.

19. The computer program product of claim 18, wherein the computer-readable program code further comprises a path selection layer (PSL) at a layer in a software stack below the SDP module and the EL2T layer, the PSL being configured to determine an egress port for a packet when transmitted over an inter-switch link to a remote network element.

20. The computer program product of claim 18, wherein the computer-readable program code further comprises a trivial file transfer protocol (TFTP) at a layer in a software stack above the EL2T layer, the TFTP being configured to push a configuration and a firmware image to a remote network element.

21. The computer program product of claim 15, wherein the computer-readable program code further comprises a check-point module (CP) configured to synchronize applications on the master network element with related databases and states at a backup network element in preparation for a backup-to-master failover.

22. The computer program product of claim 15, wherein the computer-readable program code further comprises application programs at a top layer of a software stack and a switch attach/detach module configured to provide the applications with a global view of all data ports on all the network elements in the group and to notify the applications of any change on any of the network elements.

23. The computer program product of claim 15, the computer-readable program code further comprises applications at a top layer of a software stack and a port mapping/macros module configured to provide the applications with a mapping of a global CLI (command line interface) port to a physical device and a port.

\* \* \* \* \*